(12) United States Patent
Squiers

(10) Patent No.: US 10,317,183 B2
(45) Date of Patent: Jun. 11, 2019

(54) FOLDING RULER

(71) Applicant: Milwaukee Electric Tool Corporation, Brookfield, WI (US)

(72) Inventor: Grant T. Squiers, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 89 days.

(21) Appl. No.: 15/184,703

(22) Filed: Jun. 16, 2016

(65) Prior Publication Data

US 2016/0370162 A1   Dec. 22, 2016

Related U.S. Application Data

(60) Provisional application No. 62/180,270, filed on Jun. 16, 2015.

(51) Int. Cl.
  *G01B 3/06*   (2006.01)
  *G01B 3/56*   (2006.01)

(52) U.S. Cl.
  CPC .............. *G01B 3/06* (2013.01); *G01B 3/563* (2013.01)

(58) Field of Classification Search
  CPC ....................................................... G01B 3/06
  USPC ........................................................ 33/458
  See application file for complete search history.

(56) References Cited

U.S. PATENT DOCUMENTS

| | | | | |
|---|---|---|---|---|
| 691,728 A | * | 1/1902 | Norfolk | G01B 3/06 33/496 |
| 716,150 A | * | 12/1902 | Traut et al. | G01B 3/06 33/458 |
| 756,055 A | * | 3/1904 | Rhodes | G01B 3/06 235/61 GM |
| 756,594 A | * | 4/1904 | Davis | G01B 3/06 33/498 |

(Continued)

FOREIGN PATENT DOCUMENTS

| | | | | |
|---|---|---|---|---|
| DE | 4223747 A1 | * | 1/1994 | ............... G01B 3/06 |
| EP | 0576429 | | 4/1995 | |

(Continued)

OTHER PUBLICATIONS

Packer, "Improvised Protractor Formed by Combining Folding Rule with Inch Scale" Popular Mechanics, Oct. 1949, vol. 92, No. 4, p. 223-224.

(Continued)

*Primary Examiner* — Christopher W Fulton
(74) *Attorney, Agent, or Firm* — Reinhart Boerner Van Deuren s.c.

(57) ABSTRACT

A foldable ruler includes a first ruler segment, a second ruler segment pivotally coupled to the first ruler segment, a third ruler segment pivotally coupled to the second ruler segment, and a fourth ruler segment pivotally coupled to the third ruler segment. Each of the first, second, third, and fourth ruler segments includes a first side surface and a second side surface opposite the first side surface. At least one of the first and second side surfaces includes a first set of indicia (Continued)

representing units of measurement. Each of the first, second, third, and fourth ruler segments also includes a top surface extending between the first and second side surfaces. The top surface of the fourth ruler segment includes a second set of indicia representing a plurality of angles.

22 Claims, 5 Drawing Sheets

(56) References Cited

U.S. PATENT DOCUMENTS

| | | | | |
|---|---|---|---|---|
| 1,524,730 | A * | 2/1925 | Cain | G01B 3/06 33/471 |
| 1,608,713 | A | 11/1926 | Anderson | |
| 1,849,128 | A * | 3/1932 | Wood | G01B 3/06 33/463 |
| 3,490,148 | A | 1/1970 | Mathes | |
| 4,955,141 | A * | 9/1990 | Welch | G01B 3/56 33/418 |
| 6,964,110 | B2 | 11/2005 | Shapiro | |
| D569,747 | S | 5/2008 | Ross | |
| 8,782,914 | B1 | 7/2014 | DeLuca | |
| 2004/0006881 | A1 * | 1/2004 | Shapiro | G01B 3/56 33/471 |
| 2006/0168834 | A1 * | 8/2006 | Critelli | G01B 3/06 33/458 |
| 2010/0229411 | A1 * | 9/2010 | Lai | G01B 3/06 33/458 |
| 2013/0283626 | A1 | 10/2013 | Jones | |
| 2015/0033569 | A1 * | 2/2015 | Neugaertner | G01B 3/06 33/458 |
| 2016/0025475 | A1 * | 1/2016 | Neugartner | G01B 3/06 33/458 |

FOREIGN PATENT DOCUMENTS

| | | | |
|---|---|---|---|
| EP | 1923660 | 5/2008 | |
| EP | 1965168 | 9/2008 | |
| EP | 2083242 | 7/2009 | |
| EP | 2216620 | 8/2010 | |
| EP | 2677269 | 12/2013 | |
| FR | 2342856 | 9/1977 | |
| FR | 2581752 A1 * | 11/1986 | G01B 3/02 |
| GB | 2293457 A * | 3/1996 | B43L 7/00 |
| WO | 9216816 | 10/1992 | |

OTHER PUBLICATIONS

Adga, "High Quality Folding Rulers", brochure, Available at least as early as May 26, 2015, 7 pages.

* cited by examiner

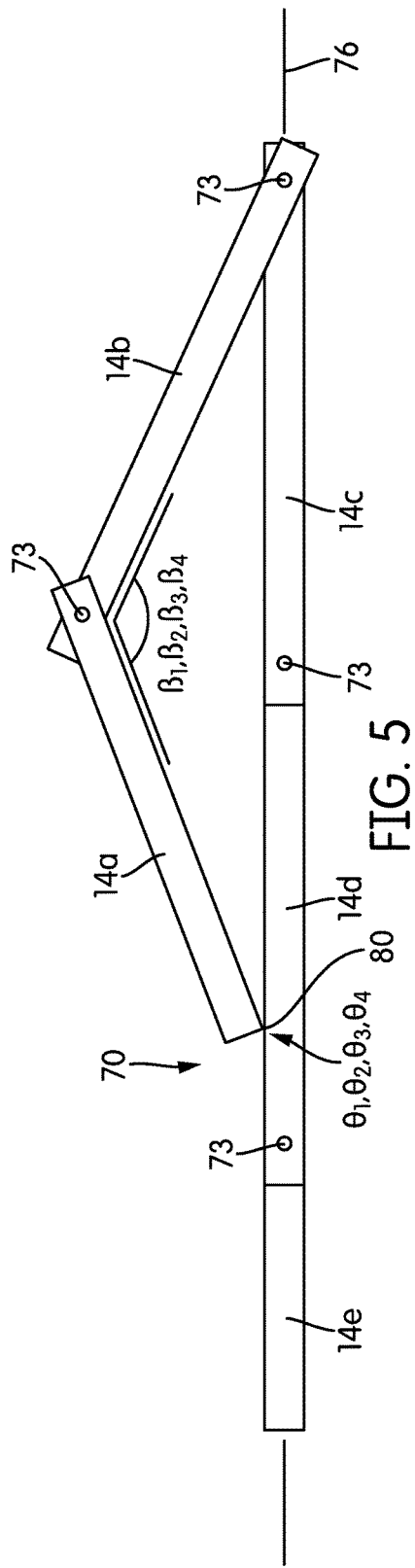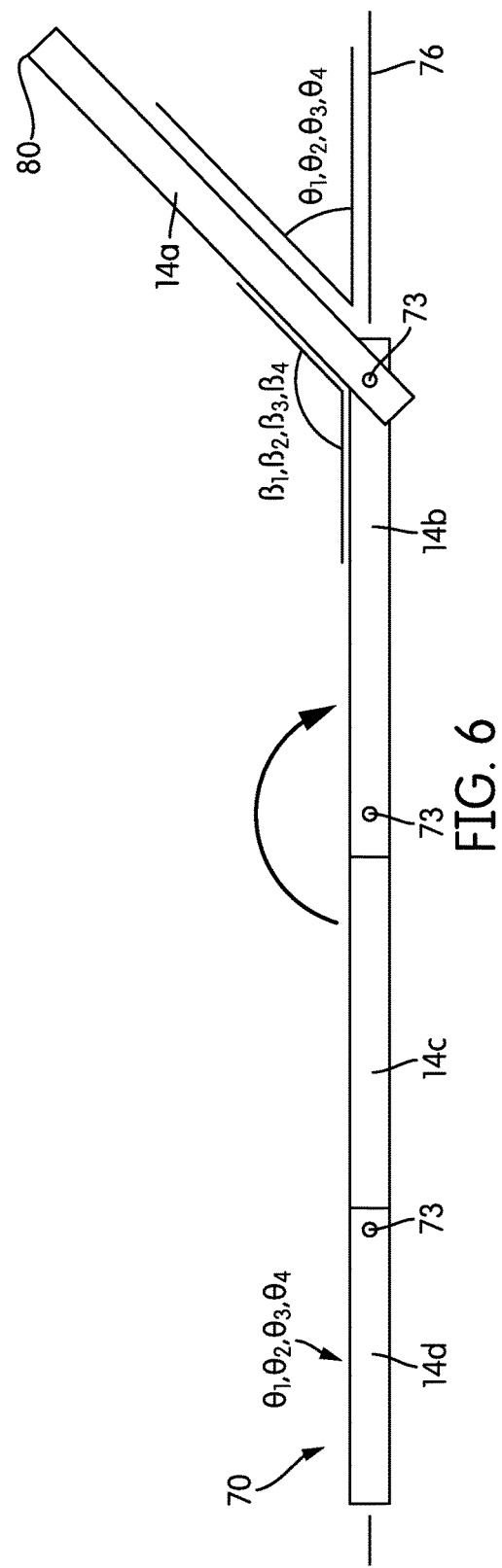

FOLDING RULER

CROSS-REFERENCE TO RELATED APPLICATIONS

The present application claims priority to U.S. Provisional Patent Application No. 62/180,270, filed on Jun. 16, 2015, the entire content of which is incorporated herein by reference.

FIELD OF THE INVENTION

The present invention relates to rulers, and more particularly to folding rulers.

SUMMARY

In one aspect, a foldable ruler includes a first ruler segment, a second ruler segment pivotally coupled to the first ruler segment, a third ruler segment pivotally coupled to the second ruler segment, and a fourth ruler segment pivotally coupled to the third ruler segment. Each of the first, second, third, and fourth ruler segments includes a first side surface and a second side surface opposite the first side surface. At least one of the first and second side surfaces includes a first set of indicia representing units of measurement. Each of the first, second, third, and fourth ruler segments also includes a top surface extending between the first and second side surfaces. The top surface of the fourth ruler segment includes a second set of indicia representing a plurality of angles.

In another aspect, a foldable ruler includes a plurality of ruler segments pivotally coupled to each other. Each of the plurality of ruler segments includes a first side surface, a second side surface opposite the first side surface, and a top surface extending between the first and second side surfaces. The top surface of at least one of the plurality of ruler segments includes a set of indicia. The set of indicia corresponds to a plurality of angles between a first ruler segment and a longitudinal axis of an adjacent ruler segment.

In yet another aspect, a foldable ruler includes a plurality of ruler segments pivotally coupled to each other. Each of the plurality of ruler segments includes a first side surface, a second side surface opposite the first side surface, and a top surface extending between the first and second side surfaces. The top surface of at least one of the plurality of ruler segments includes a set of indicia representing a plurality of angles.

BRIEF DESCRIPTION OF THE DRAWINGS

FIG. 5 illustrates the folding ruler in a first position with a first ruler segment aligned with one of the angle indicia of FIG. 4.

FIG. 6 illustrates the folding ruler in a second position with the one of the plurality of angles of FIG. 5 transposed between the first ruler segment and a longitudinal axis of an adjacent ruler segment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
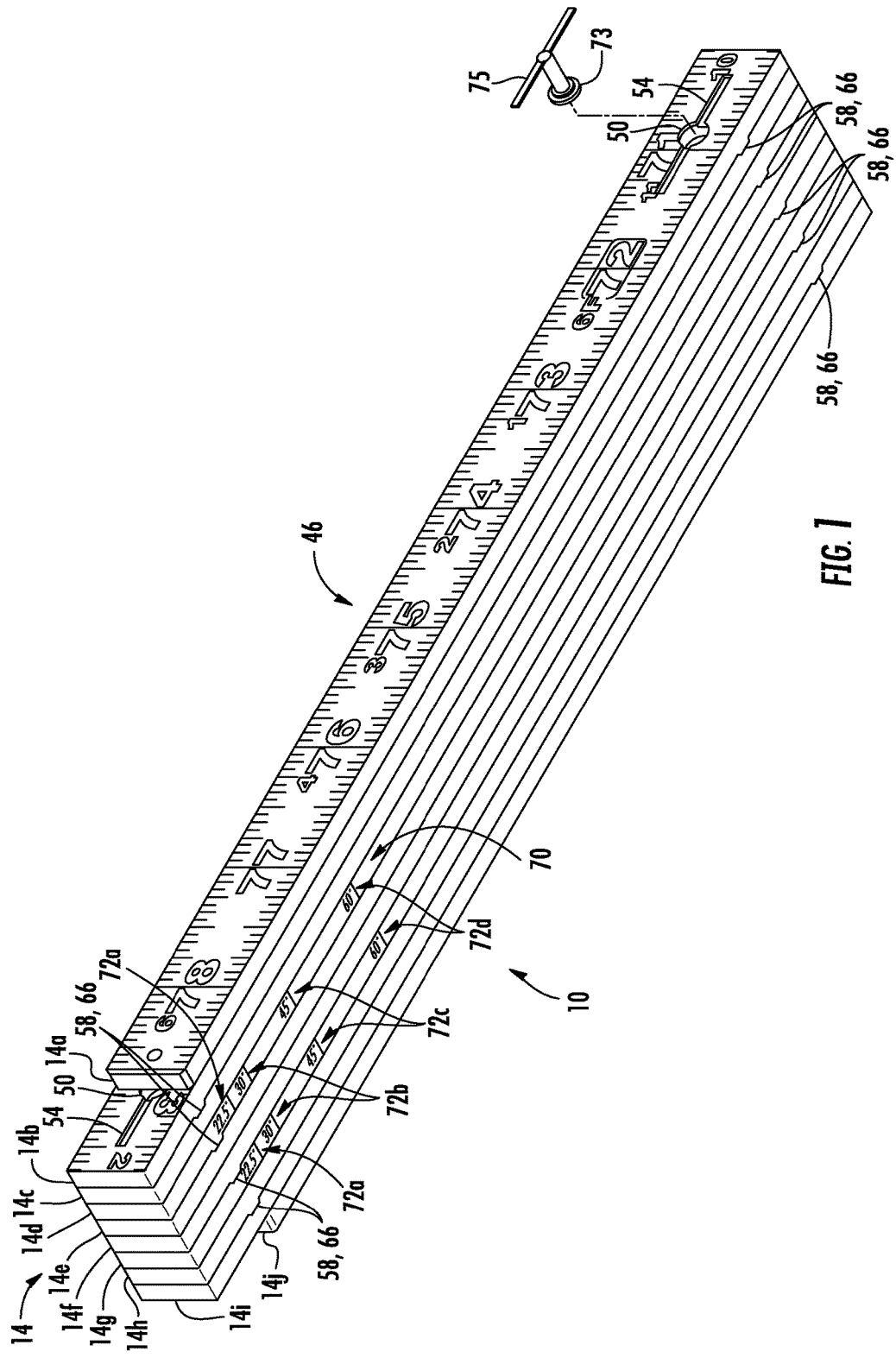
FIG. 1 is a perspective view of a folding ruler according to an embodiment of the invention.

FIG. 1 illustrates a folding ruler 10 including a plurality of ruler segments 14 pivotally coupled together. In the illustrated embodiment, the folding ruler 10 includes ten ruler segments and respective ruler segments are separately indicated, e.g., a first ruler segment 14a through a tenth ruler segment 14j. In other embodiments, the folding ruler 10 may include fewer or more than ten ruler segments. The illustrated ruler segments 14a, 14j—otherwise referenced as end ruler segments—are attached to one adjacent ruler segment, whereas the ruler segments 14b through 14i are attached to two adjacent ruler segments.

Figure 2:
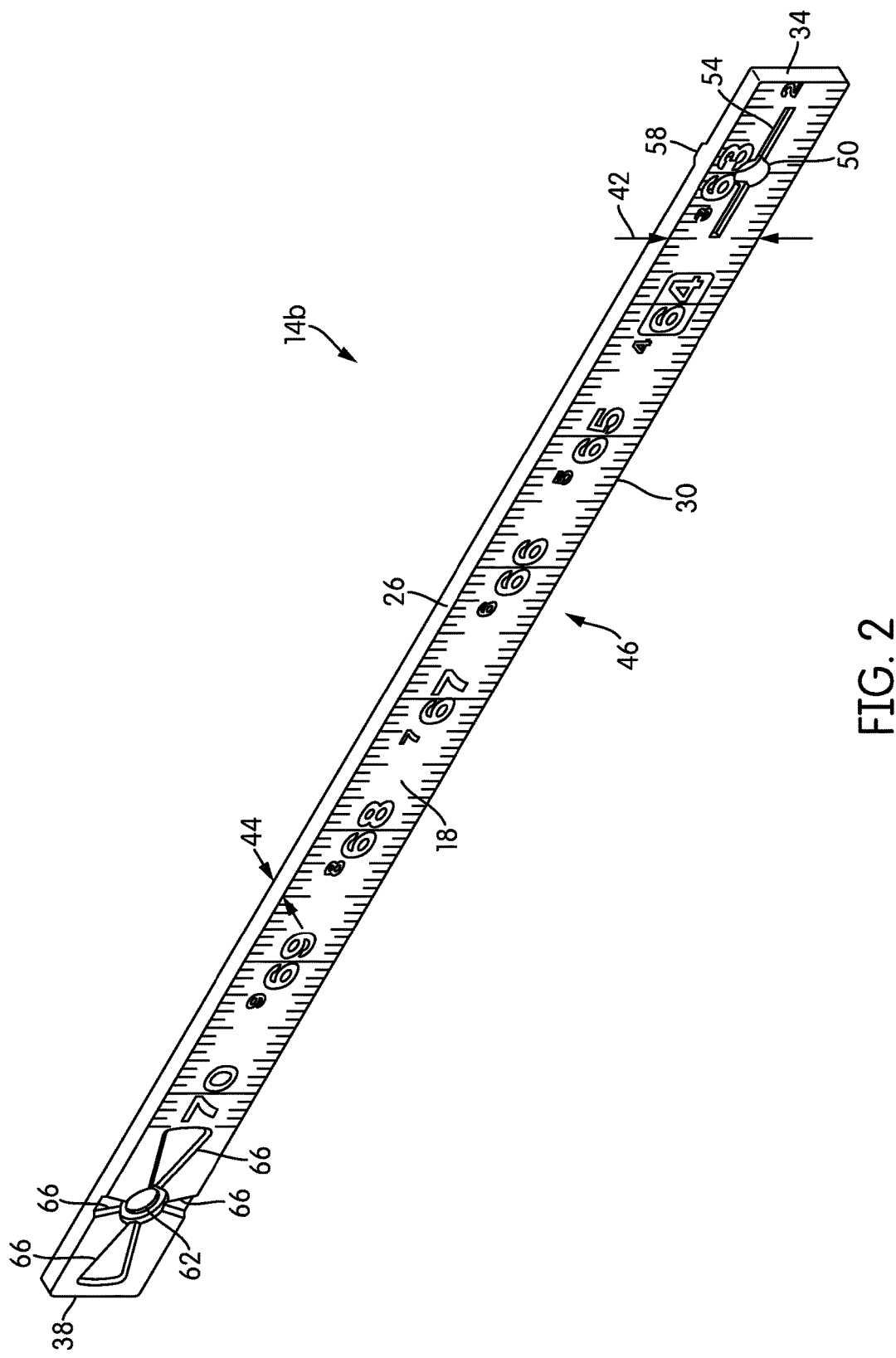
FIG. 2 is a left-side perspective view of a segment of the folding ruler.
Figure 3:
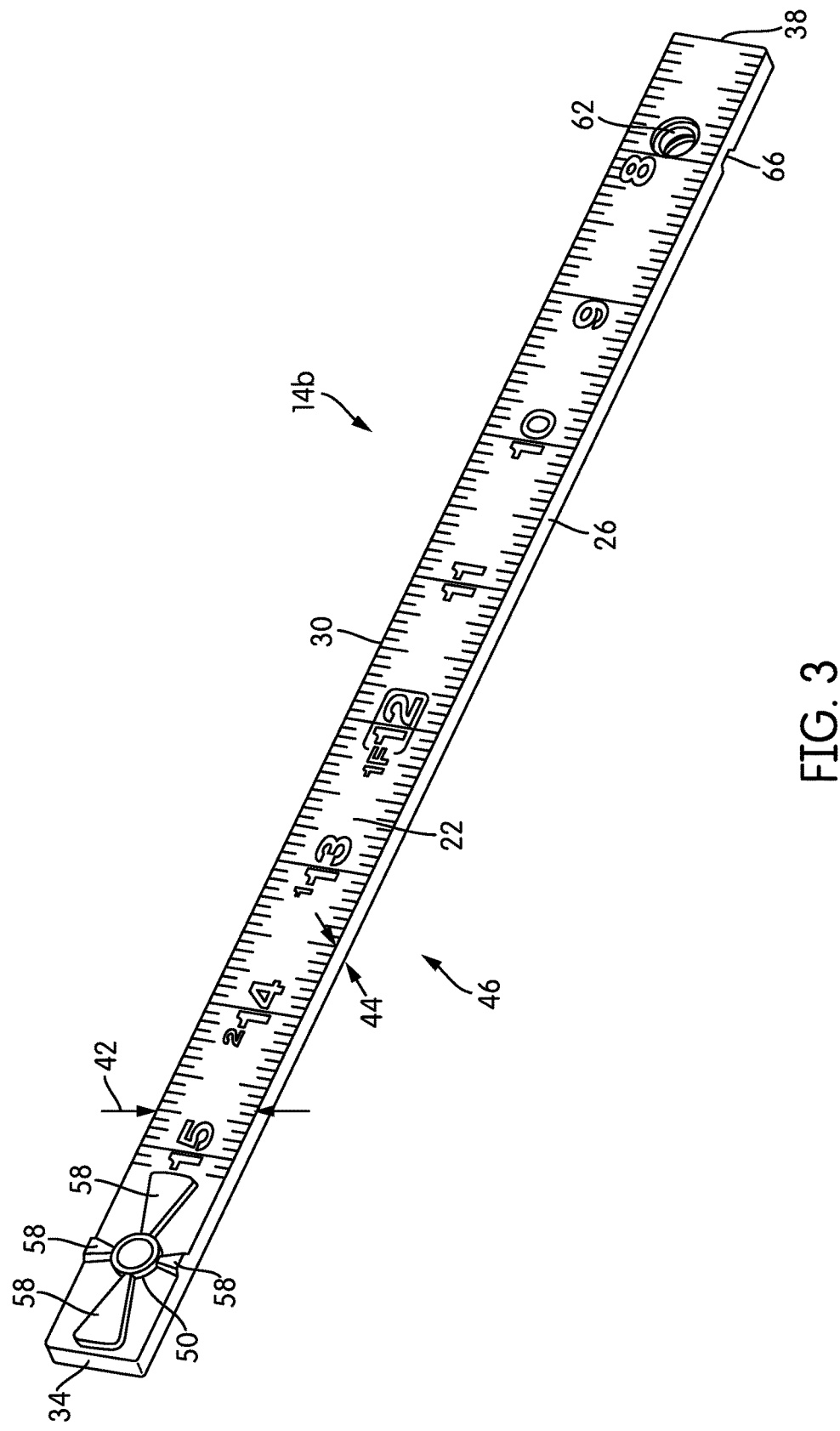
FIG. 3 is a right-side perspective view of the segment of FIG. 2.

With reference to FIGS. 2 and 3, the ruler segments 14a through 14j (although ruler segment 14b is only illustrated in FIGS. 2 and 3) each include a first side surface 18, a second side surface 22, a top surface 26, a bottom surface 30, a first end surface 34, and a second end surface 38. The illustrated first side surface 18 is opposite from the second side surface 22 and both include a side surface width 42 that is greater than a surface width 44 of the surfaces 26, 30, 34, 38. In addition, the first side and second side surfaces 18, 22 include a first set of indicia 46 representing units of measurement (e.g., units of length). The illustrated first set of indicia 46 includes an inch scale incrementing every whole number and having markings every $1\backslash16^{th}$ of an inch between the whole numbers. Units of feet are also represented by whole numbers at the corresponding inch indicia. Each of the ruler segments 14a through 14j includes a unique sequence of indicia 46 configured to align in series to provide a measurement of length greater than a single ruler segment. For example, the folding ruler 10 can measure lengths up to 79 inches; however, in other embodiments, the folding ruler 10 may measure lengths less than or greater than 79 inches depending on the number and the lengths of the ruler segments 14. In other embodiments, the first set of indicia 46 may represent other units of length, e.g., meters, centimeters, etc. In further embodiments, the first set of indicia 46 may represent other units of measurement, e.g., tile gradations, brick mason layer measurements, circumference gradations, etc.

In continued reference to FIGS. 2 and 3, the ruler segments 14a through 14i include a first aperture 50, a slot 54, and protrusions 58 located adjacent the first end surface 34. The illustrated first aperture 50 extends from the first side surface 18 to the second side surface 22, the illustrated slot 54 is elongated and extends from the first side surface 18 partially towards the second side surface 22, and the illustrated protrusions 58 extend outwardly from the second side surface 22 and are substantially orientated at 90 degrees relative to each other. In addition, the protrusions 58 define wedged-shaped members increasing in dimension away from the first aperture 50.

Furthermore, the ruler segments 14b through 14j include a second aperture 62 and recessed portions 66 located adjacent the second end surface 38. The illustrated second aperture 62 is a double countersunk hole extending from the first side surface 18 to the second side surface 22. The illustrated recessed portions 66 are sized similar to the protrusions 58 such that the protrusions 58 of a ruler segment are configured to seat within the recessed portions 66 of another ruler segment.

Figure 4:
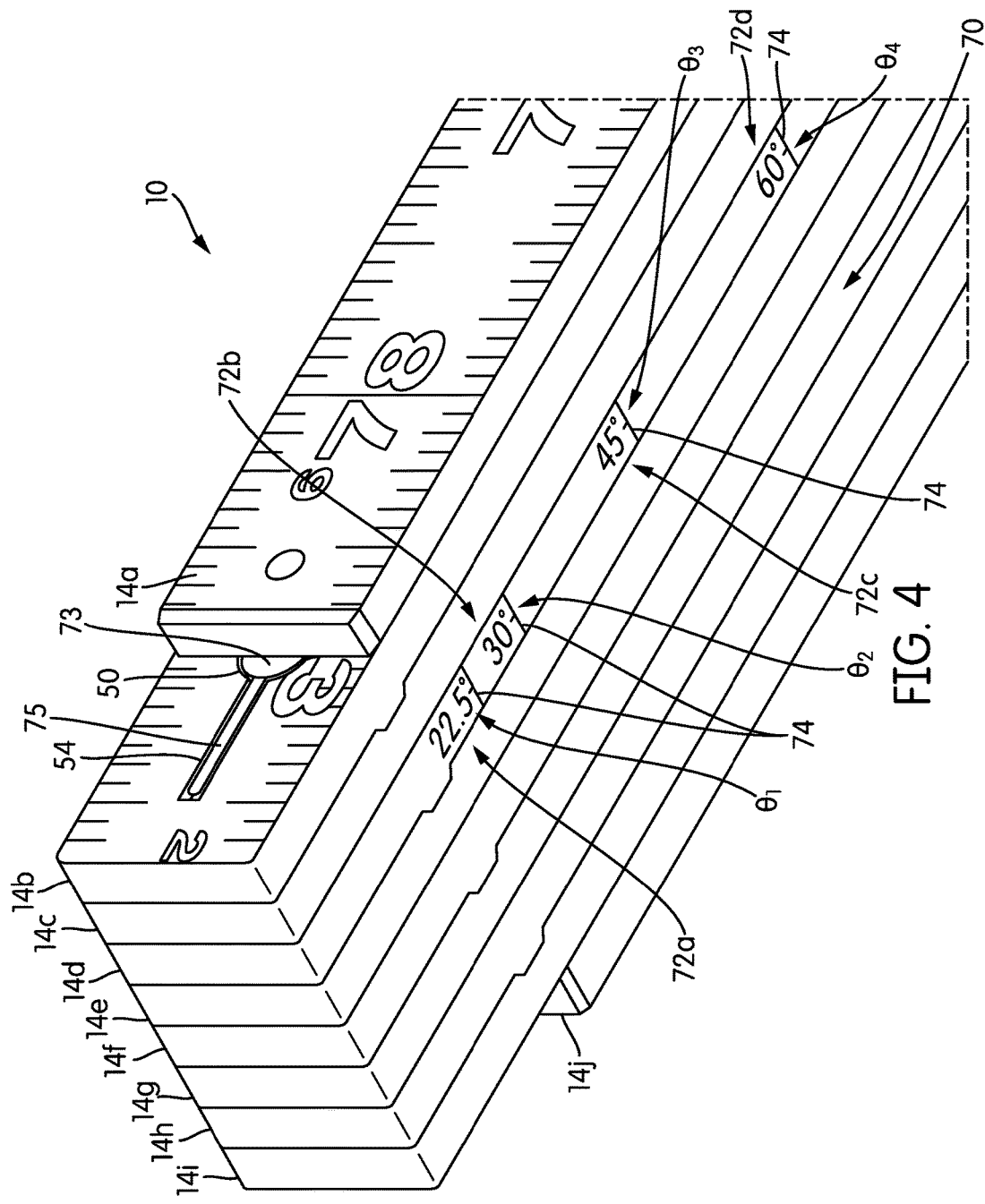
FIG. 4 is a detailed view of FIG. 1 illustrating a set of indicia representing a plurality of angles.

With reference to FIG. 4, a second set of indicia 70 is located on one of the top surface 26 or the bottom surface 30 of the fourth ruler segment 14*d* and includes angle markings 72*a*, 72*b*, 72*c*, 72*d*. In one embodiment, the second set of indicia 70 may be located on the top surface 26 and the bottom surface 30 of the fourth ruler segment 14*d*. In other embodiments, the indicia 70 may be located on other ruler segments, e.g., on the seventh ruler segment 14*g*. In further embodiments, the second set of indicia 70 may be located on at least one of the side surfaces 18, 22 of the fourth ruler segment 14*d* and/or the seventh ruler segment 14*g*. The illustrated angle markings 72*a*, 72*b*, 72*c*, 72*d* each include a line 74 extending between the side surfaces 18, 22 that is associated with an angle $\theta_1$, $\theta_2$, $\theta_3$, $\theta_4$. In particular, the line 74 associated with the first angle marking 72*a* represents a 22.5 degree marking, the line 74 associated with the second angle marking 72*b* represents a 30 degree marking, the line 74 associated with the third angle marking 72*c* represents a 45 degree marking, and the line 74 associated with the fourth angle marking 72*d* represents a 60 degree marking. In other embodiments, the angle markings 72*a*, 72*b*, 72*c*, 72*d* may include fewer or more than four markings and/or the angles $\theta_1$, $\theta_2$, $\theta_3$, $\theta_4$ represent different angles, e.g., 40 degree angle, 50 degree angle, etc.

The illustrated ruler segments 14*a* through 14*j* are assembled such that the protrusions 58 of a ruler segment align with the recessed portions 66 of an adjacent ruler segment. The ruler segments 14*a* through 14*j* are pivotally attached together utilizing a pin 73. For example, the pin 73 is received through and seated within the countersunk portion of the second aperture 62 of one ruler segment. In addition, the pin 73 is also received through the first aperture 50 of the adjacent ruler segment. The pin 73 is maintained within the apertures 50, 62 thereby coupling adjacent ruler segments together by a resilient locking rod 75, which is positioned within the slot 54 and received through the pin 73. The resilient locking rod 75 allows axial movement—perpendicular to the rotational movement—of adjacent ruler segments as the ruler segments pivot relative to each other. In particular, as the ruler segments 14*a* through 14*j* rotate relative to each other, the protrusions 58 temporarily disengage from the recessed portions 66 with the resilient locking rod 75 biasing the two adjacent ruler segments together for reengagement between the protrusions 58 and the recessed portions 66. As such, the resilient locking rod 75 enables one ruler segment to be held at any position—360 degrees—relative to another ruler segment.

The operation and method of utilizing the second set of indicia 70 is illustrated in FIGS. 5 and 6. In the illustrated embodiment, at least the third and fourth ruler segments 14*c*, 14*d* are pivoted relative to each other such that a longitudinal axis 76 extends through, e.g., co-axial with, the third and fourth segments 14*c*, 14*d*. The first and second ruler segments 14*a*, 14*b* are also pivoted relative to the third and fourth ruler segments 14*c*, 14*d* such that an edge 80 of the first ruler segment 14*a* aligns with one of the angle markings 72*a*, 72*b*, 72*c*, 72*d*. In other words, the edge 80 aligns with a desired angle $\theta_1$, $\theta_2$, $\theta_3$, $\theta_4$. In other embodiments, a marker, e.g., a pointer, may be included at the edge 80 for easy alignment with the desired angle $\theta_1$, $\theta_2$, $\theta_3$, $\theta_4$. As the edge 80 aligns with the desired angle $\theta_1$, $\theta_2$, $\theta_3$, $\theta_4$, supplementary angles $\beta_1$, $\beta_2$, $\beta_3$, $\beta_4$ with respect to the angles $\theta_1$, $\theta_2$, $\theta_3$, $\theta_4$ represent an angle between the first and second ruler segments 14*a*, 14*b*. For example, the first supplementary angle $\beta_1$ equals 180 degrees minus the first angle $\theta_1$.

With reference to FIG. 6, while maintaining the supplementary angle $\beta_1$, $\beta_2$, $\beta_3$, $\beta_4$ between the first and second ruler segments 14*a*, 14*b* fixed, the first and second ruler segments 14*a*, 14*b* co-rotate relative to the third and fourth ruler segments 14*c*, 14*d* until the second ruler segment 14*b* is co-axial with the longitudinal axis 76. As such, the desired angle $\theta_1$, $\theta_2$, $\theta_3$, $\theta_4$ indicated on the fourth ruler segment 14*d* is transposed between the first ruler segment 14*a* and the longitudinal axis 76 of at least the second ruler segment 14*b*.

Although the invention has been described in detail with reference to certain preferred embodiments, variations and modifications exist within the scope and spirit of one or more independent aspects of the invention as described.

The invention claimed is:

1. A foldable ruler comprising:
   a first ruler segment;
   a second ruler segment pivotally coupled to the first ruler segment;
   a third ruler segment pivotally coupled to the second ruler segment;
   a fourth ruler segment pivotally coupled to the third ruler segment;
   a fifth ruler segment pivotally coupled to the fourth ruler segment;
   a sixth ruler segment pivotally coupled to the fifth ruler segment;
   a seventh ruler segment pivotally coupled to the sixth ruler segment;
   a first set of indicia representing units of measurement;
   a second set of indicia comprising a plurality of numerical angle markings and a line associated with each of the numerical angle markings;
   wherein each of the first, second, third, fourth, fifth, sixth, and seventh ruler segments includes a first side surface, a second side surface opposite the first side surface, wherein the first set of indicia is located on at least one of the first and second side surfaces; and
   wherein each of the first, second, third, fourth, fifth, sixth, and seventh ruler segments also includes a top surface extending between the first and second side surfaces, wherein the numerical angle markings are located on the top surface of the fourth ruler segment and the top surface of the seventh ruler segment.

2. The foldable ruler of claim 1, wherein a portion of the first ruler segment is alignable with a first numerical angle marking of the second set of indicia so that the first numerical angle marking corresponds to an angle between the first ruler segment and a longitudinal axis of the second ruler segment.

3. The foldable ruler of claim 2, wherein the portion of the first ruler segment is an edge of the first ruler segment.

4. The foldable ruler of claim 1, wherein the second set of indicia includes four numerical angle markings.

5. The foldable ruler of claim 4, wherein the line associated with each of the numerical angle markings extends along the top surface between the first and second side surfaces of the fourth ruler segment and on the seventh ruler segment.

6. The foldable ruler of claim 4, wherein a first numerical angle marking includes a 22.5 degree marking, a second numerical angle marking includes a 30 degree marking, a third numerical angle marking includes a 45 degree marking, and a fourth numerical angle marking includes a 60 degree marking.

7. The foldable ruler of claim 1, wherein the first set of indicia represents units of length.

8. The foldable ruler of claim 1, wherein the second set of indicia is only located on the top surface of the fourth ruler segment.

9. The foldable ruler of claim 1, wherein each of the pivotally couplings between the first, second, third, fourth, fifth, sixth, and seventh ruler segments defines a pivot axis, wherein the first and second side surfaces of each of the first, second, third, fourth, fifth, sixth, and seventh ruler segments are perpendicular to the pivot axes and the top surface of the fourth ruler is parallel to the pivot axes.

10. A foldable ruler comprising:
seven or more ruler segments pivotally coupled to each other via a resilient locking rod biasing the plurality of ruler segments together, each of the ruler segments including a first side surface, a second side surface opposite the first side surface, and a top surface extending between the first and second side surfaces, the top surface of at least a fourth ruler segment and a seventh ruler segment including a set of indicia;
wherein the set of indicia corresponds to a plurality of angles between a first ruler segment and a longitudinal axis of an adjacent ruler segment; and
wherein the set of indicia includes a plurality of numerical angle markings located on the top surface of at least the fourth ruler segment and the seventh ruler segment;
wherein the first and second side surfaces of the ruler segments define a side surface width that is greater than a top surface width of the top surfaces of the ruler segments.

11. The foldable ruler of claim 10, wherein a portion of a first ruler segment is alignable with a first numerical angle marking of the set of indicia so that the first angle marking corresponds to an angle between the first ruler segment and the longitudinal axis of the adjacent ruler segment, wherein the first ruler segment includes a protrusion extending outwardly from the second side surface of the first ruler segment and the adjacent ruler segment includes a recessed portion located in the first side surface of the adjacent ruler segment, wherein protrusion seats within the recessed portion when the first ruler segment and the adjacent ruler segment are pivoted relative to each other to a position where the protrusion aligns with the recessed portion.

12. The foldable ruler of claim 10, wherein the set of indicia includes four numerical angle markings.

13. The foldable ruler of claim 12, wherein the set of indicia includes a line associated with each of the four numerical angle markings that extends between the first and second side surfaces of the one of the plurality of ruler segments.

14. The foldable ruler of claim 12, wherein a first numerical angle marking includes a 22.5 degree marking, a second numerical angle marking includes a 30 degree marking, a third numerical angle marking includes a 45 degree marking, and a fourth numerical angle marking includes a 60 degree marking.

15. The foldable ruler of claim 10, wherein each of the pivotally couplings between the ruler segments defines a pivot axis, wherein the first and second side surfaces of each of the ruler segments is perpendicular to the pivot axes and the top surface of the at least one of the ruler segments is parallel to the pivot axes.

16. A foldable ruler comprising:
seven or more ruler segments pivotally coupled to each other, each of the ruler segments including a first side surface, a second side surface opposite the first side surface, a planar top surface extending between the first and second side surfaces, and a planar bottom surface extending between the first and second side surfaces and parallel to the planar top surface; and
a set of indicia on a fourth segment and on a seventh segment representing a plurality of angles, the set of indicia located on the planar top surface of at least the fourth ruler segment and the seventh ruler segment;
wherein each of the plurality of ruler segments are pivotally coupled to each other at a location located vertically between the planar top surface and planar bottom surface of each of the ruler segments.

17. The foldable ruler of claim 16, wherein a portion of a first ruler segment is alignable with a first angle marking of the set of indicia so that the first angle marking corresponds to an angle between the first ruler segment and a longitudinal axis of an adjacent ruler segment.

18. The foldable ruler of claim 16, wherein the set of indicia includes four numerical angle markings all located on the top surface of at least fourth ruler segment and the seventh ruler segment.

19. The foldable ruler of claim 18, wherein the set of indicia includes a line associated with each of the numerical angle markings that extends along the top surface between the first and second side surfaces of the ruler segments.

20. The foldable ruler of claim 18, wherein a first numerical angle marking includes a 22.5 degree marking, a second numerical angle marking includes a 30 degree marking, a third numerical angle marking includes a 45 degree marking, and a fourth numerical angle marking includes a 60 degree marking.

21. The foldable ruler of claim 16, wherein the first and second side surfaces of the ruler segments define a side surface width that is greater than a top surface width of the top surfaces of the ruler segments.

22. The foldable ruler of claim 16, wherein each of the pivotally couplings between the ruler segments defines a pivot axis, wherein the first and second side surfaces of each of the ruler segments is perpendicular to the pivot axes and the top surface of the at least one of the ruler segments is parallel to the pivot axes.

* * * * *